United States Patent
Huang et al.

(10) Patent No.: US 11,218,208 B2
(45) Date of Patent: Jan. 4, 2022

(54) CSI-RS MEASUREMENT FEEDBACK METHOD AND DEVICE

(71) Applicant: HUAWEI TECHNOLOGIES CO., LTD., Shenzhen (CN)

(72) Inventors: Yi Huang, Shenzhen (CN); Haibao Ren, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/797,482

(22) Filed: Feb. 21, 2020

(65) Prior Publication Data

US 2020/0195329 A1 Jun. 18, 2020

Related U.S. Application Data

(63) Continuation of application No. PCT/CN2018/102539, filed on Aug. 27, 2018.

(30) Foreign Application Priority Data

Aug. 28, 2017 (CN) .......................... 201710751755.9

(51) Int. Cl.
*H04L 5/00* (2006.01)
*H04B 7/06* (2006.01)
*H04B 7/0417* (2017.01)

(52) U.S. Cl.
CPC ......... *H04B 7/0626* (2013.01); *H04B 7/0417* (2013.01); *H04L 5/0048* (2013.01)

(58) Field of Classification Search
USPC ........................................................ 375/267
See application file for complete search history.

(56) References Cited

U.S. PATENT DOCUMENTS

2013/0343299 A1 12/2013 Sayana et al.
2015/0139112 A1 5/2015 Park et al.
(Continued)

FOREIGN PATENT DOCUMENTS

CN 101291192 A 10/2008
CN 104184537 A 12/2014
(Continued)

OTHER PUBLICATIONS

3GPP TS 36.213 V1.2.0:"3rd Generation Partnership Project;Technical Specification Group Radio Access Network; Physical layer procedures(Release 8)",May 2007,total 10 pages.
(Continued)

*Primary Examiner* — Eva Y Puente
(74) *Attorney, Agent, or Firm* — Rimon PC (57) ABSTRACT

A CSI-RS measurement feedback method and device are provided to optimize analog and digital precoding. A network device sends S CSI-RSs to a terminal device. Each CSI-RS corresponds to one antenna port number. The terminal device sends M antenna port numbers that correspond to M CSI-RSs and sends a PMI that corresponds to a channel matrix H or the quantization result of a channel matrix H to the network device. The terminal device selects the M antenna port numbers that correspond to the M CSI-RSs from the S antenna port numbers that correspond to the S CSI-RSs, and feeds back the M antenna port numbers to the network device.

17 Claims, 3 Drawing Sheets

(56) References Cited

U.S. PATENT DOCUMENTS

| | | | |
|---|---|---|---|
| 2015/0341092 A1* | 11/2015 | Park | H04L 5/0057 |
| | | | 370/329 |
| 2017/0288751 A1* | 10/2017 | Faxer | H04B 7/0465 |
| 2018/0031478 A1* | 2/2018 | Wexler | G01N 21/6428 |
| 2018/0152225 A1* | 5/2018 | Dinan | H04W 72/0426 |
| 2019/0007107 A1* | 1/2019 | Kim | H04B 7/0478 |
| 2019/0149306 A1* | 5/2019 | Gao | H04L 5/0023 |
| | | | 370/252 |
| 2020/0204219 A1* | 6/2020 | Takano | H04B 7/0413 |
| 2020/0228266 A1* | 7/2020 | Kim | H04B 7/06 |
| 2020/0322816 A1* | 10/2020 | Xu | H04B 7/0417 |

FOREIGN PATENT DOCUMENTS

| | | |
|---|---|---|
| CN | 104579586 A | 4/2015 |
| CN | 105580468 A | 5/2016 |
| CN | 106209195 A | 12/2016 |
| CN | 106301507 A | 1/2017 |
| CN | 106559121 A | 4/2017 |
| CN | 106688190 A | 5/2017 |
| CN | 106992837 A | 7/2017 |
| WO | 2012144866 A2 | 10/2012 |
| WO | 2012148742 A2 | 11/2012 |
| WO | 2017105129 A1 | 6/2017 |

OTHER PUBLICATIONS

"High Throughput (HT) PHY specification", IEEE Draft; Draft P802.11 REVMB_D3.0 Word Conversion Clause 20, IEEE-SA, Piscataway, NJ USA vol. 802.111 drafts, No. D3.0, Mar. 2010 (Jun. 7, 2010), pp. 1-137, XP068136371.

* cited by examiner

CSI-RS MEASUREMENT FEEDBACK METHOD AND DEVICE

CROSS-REFERENCE TO RELATED APPLICATIONS

This application is a continuation of International Application No. PCT/CN2018/102539, filed on Aug. 27, 2018, which claims priority to Chinese Patent Application No. 201710751755.9, filed on Aug. 28, 2017. The disclosures of the aforementioned applications are hereby incorporated by reference in their entireties.

TECHNICAL FIELD

This application relates to the field of wireless communications technologies, and in particular, to a CSI-RS measurement feedback method and device.

BACKGROUND

To meet rapid growth of mobile data, a future wireless communications system needs to further improve system capacity and ensure quality of service (QoS) requirement. Many new technologies and concepts such as massive multiple-input multiple-output (MIMO) and dense network technologies are developed to meet the requirements. In addition, the communication industry also turns to high frequency band communication when large bandwidth in a millimeter wave segment has opened up and millimeter wave communication has become one of the technologies with development potential in future 5G radio communications systems.

In a millimeter wave communications system, digital-analog hybrid precoding is a research focus. A digital-analog hybrid architecture is a compromise between a conventional digital MIMO architecture and a pure analog architecture. One on hand, power loss and hardware costs can be reduced, and on the other hand, a relatively large degree of freedom can be provided to achieve an array gain and a diversity gain, so that system performance can be sustained. However, in the digital-analog hybrid architecture, because the number of digital channels is fewer than the number of antennas, a pilot frequency to be transmitted is weighted through analog precoding whose precoding weight usually remains unchanged, which would adversely affect performance of the digital-analog hybrid architecture.

SUMMARY

This application provides a CSI-RS measurement feedback method and device, to optimize analog precoding and digital precoding.

According to a first aspect, this application provides a CSI-RS measurement feedback method, where the method includes: receiving, by a terminal device, S channel state information reference signals (CSI-RSs) sent by a network device, sending, by the terminal device, M antenna port numbers that correspond to M CSI-RSs to the network device, and sending a precoding matrix indicator (PMI) that corresponds to a channel matrix H or a quantization result of a channel matrix H to the network device. Each CSI-RS corresponds to one antenna port number, and S is a positive integer. The channel matrix H corresponds to the M CSI-RSs. Any row in the channel matrix H includes M elements, S>M or S=M, and M is a positive integer.

According to the foregoing method, the terminal device selects the M antenna port numbers that correspond to the M CSI-RSs from S antenna port numbers that correspond to the S CSI-RSs, and feeds back the M antenna port numbers to a base station, to assist the network device in determining M analog precoding weights that correspond to the M antenna port numbers, so that an analog beam determined based on the M analog precoding weights can better point to the terminal device. Therefore, performance of hybrid beamforming (HBF) can be improved, spectrum utilization efficiency can be improved, and throughput can be improved. Further, the terminal device sends the PMI that corresponds to the channel matrix H or the quantization result of the channel matrix H to the network device, to assist the network device in determining the precoding matrix, and optimizing digital precoding.

Optionally, M may be configured by the network device or determined by the terminal device.

In a possible design, the M CSI-RSs are M CSI-RSs whose signal receiving strengths are selected by the terminal device in descending order from signal receiving strengths that respectively correspond to the S CSI-RSs.

According to the foregoing method, the M CSI-RSs are CSI-RSs with relatively high signal receiving strengths, to assist the network device in selecting an analog precoding weight.

In a possible design, the terminal device may send the M antenna port numbers that correspond to the M CSI-RSs to the network device by using but not limited to the following two methods:

Method 1: The terminal device sends the M antenna port numbers on a physical uplink shared channel PUSCH or a PUCCH.

In a possible design, the M antenna port numbers may also be fed back to the network device in a form of a bitmap.

Method 2: The terminal device sends PMIs of first matrices that correspond to the M antenna port numbers in a first codebook. The first codebook includes a plurality of predefined first matrices, each first matrix corresponds to one PMI, and each first matrix is an S×1 matrix. S elements in each first matrix correspond one-to-one to S antenna port numbers that correspond to the S CSI-RSs, the values of elements that respectively correspond to the M antenna port numbers in each of the first matrices that correspond to the M antenna port numbers are 1, and the values of remaining S-M elements are 0. In a possible design, a structure of the first matrix may be W=[0, 1, 1, . . . , 0], and W is an S×1 matrix, where M elements are 1, and other elements are 0.

Therefore, this application provides a plurality of possible implementations of feeding back the M antenna port numbers. If the M antenna port numbers are fed back by using Method 2, only the PMIs of the first matrices that correspond to the M antenna port numbers need to be fed back, so that uplink overheads can be reduced.

In a possible design, the quantization result of the channel matrix H includes quantized values of modulus values and quantized values of phases that respectively correspond to M elements that are included in a quantization matrix H that corresponds to the channel matrix H.

The quantization result of the channel matrix H is determined by using a throughput maximization principle or an estimated signal to interference plus noise ratio (SINR) maximization principle.

According to the foregoing method, the uplink overheads can be effectively reduced.

In a possible design, the quantization result of the channel matrix H includes M groups of values, and an $i^{th}$ group of values includes a value of an $i^{th}$ $k_1$ and a value of an $i^{th}$ $k_2$ that respectively correspond to $|h_{i1}|$ and, $\phi_{i1}$, where $$H' = [h_{11}, \ldots, h_{i1}, \ldots, h_{M1}]^T =$$
$$[|h_{11}|e^{j\phi_{1,1}}, \ldots, |h_{i1}|e^{j\phi_{i,1}}, \ldots, |h_{M1}|e^{j\phi_{M,1}}]^T,$$

$$|h_{i1}| = a + (b-a)\left(\frac{1}{2^{B_{amp}+1}} + \frac{1}{2^{B_{amp}}}k_1\right), k_1 = 0, 1, \ldots, 2^{B_{amp}} - 1$$

$$\phi_{i1} = 2\pi\left(\frac{1}{2^{B_\phi+1}} + \frac{1}{2^{B_\phi+1}}k_2\right), k_2 = 0, 1, \ldots, 2^{B_\phi} - 1,$$

a indicates a minimum quantization value, b indicates a maximum quantization value, $B_{amp}$ indicates a quantity of quantization bits of $|h_{i1}|$, $B_\phi$ indicates a quantity of quantization bits of $\phi_{i1}$, i is a positive integer less than or equal to M, and the M groups of values all meet a throughput maximization principle or an estimated signal to interference plus noise ratio maximization principle.

According to the foregoing method, the uplink overheads can be effectively reduced.

In a possible design, the quantization result of the channel matrix H includes a quantized value of |H| a modulus value of the quantization matrix H', the quantized values of phases ($\phi_{1,1}, \ldots, \phi_{i,1}, \ldots, \phi_{M,1}$) that respectively correspond to the M elements, and quantized values of transformation phases ($\psi_{M,1}, L, \psi_{i,1}, L, \psi_{2,1}$) at respectively correspond to an $M^{th}$ element to the second element, so that the network device recovers $H_1$ according to the following formula:

$$H_1 = |H|DG_{M1}{}^T(\psi_{M,1})L \ G_{i1}{}^T(\psi_{i,1})L \ G_{21}{}^T(\psi_{2,1})e_1,$$
where $$H' = [h_{11}, \ldots, h_{i1}, \ldots, h_{M1}]^T = [|h_{11}|e^{j\phi_{1,1}}, \ldots, |h_{M1}|e^{j\phi_{M,1}}]^T,$$

a diagonal matrix D is:

$$D = \begin{bmatrix} e^{j\phi_{1,1}} & L & 0 & L & 0 \\ 0 & O & 0 & L & 0 \\ M & 0 & e^{j\phi_{i,1}} & 0 & M \\ M & M & 0 & O & 0 \\ 0 & 0 & L & 0 & e^{j\phi_{M,1}} \end{bmatrix},$$

a $k^{th}$ Givens rotation matrix is:

$$G_{i1}(\psi_{i,1}) = \begin{bmatrix} 0 & 0 & 0 & 0 & 0 \\ 0 & \cos(\psi_{i,1}) & 0 & \sin(\psi_{i,1}) & 0 \\ 0 & 0 & I_{i-2} & 0 & 0 \\ 0 & -\sin(\psi_{i,1}) & 0 & \cos(\psi_{i,1}) & 0 \\ 0 & 0 & 0 & 0 & 0 \end{bmatrix},$$

i is a positive integer less than or equal to M, the transformation phases ($\psi_{M,1}, L, \psi_{i,1}, L, \psi_{2,1}$) that respectively correspond to the $M^{th}$ element to the second element are obtained based on the channel matrix H and the diagonal matrix D, $e_1 = [1, 0, \ldots, 0]^T$, and $I_{i-2}$ represents an identity matrix of $(i-2) \times (i-2)$.

According to the foregoing method, that is, a Givens transformation method, a feedback amount, namely, uplink overheads, can be significantly reduced. Compared with a total feedback amount in a direct feedback manner, the uplink overheads can be reduced by approximately 50%.

In a possible design, the terminal device may define a codebook, the codebook includes a plurality of predefined precoding matrices, and each precoding matrix has a corresponding PMI. After each precoding matrix is matched with the channel matrix H, a precoding matrix closest to the channel matrix H is selected, and a corresponding PMI is fed back.

In a possible design, after the terminal device sends the M antenna port numbers that correspond to the M CSI-RSs to the network device, and sends the precoding matrix indicator PMI that corresponds to the channel matrix H or the quantization result of the channel matrix H to the network device, the terminal device receives data that is sent by the network device to the terminal device by using antenna ports that respectively correspond to the M antenna port numbers. The data is data encoded based on the precoding matrix.

According to the foregoing method, the network device selects the analog precoding weights based on the M antenna port numbers, determines the precoding matrix based on the PMI that corresponds to the channel matrix H or the quantization result of the channel matrix H, then encodes, by using the precoding matrix, the data that needs to be sent to the terminal device, and sends the data to the terminal device.

According to a second aspect, this application provides a CSI-RS measurement feedback method, where the method includes: sending, by a network device, S CSI-RSs, receiving, by the network device, M antenna port numbers that correspond to M CSI-RSs sent by a terminal device, and a PMI that corresponds to a channel matrix H or a quantization result of a channel matrix H. Each CSI-RS corresponds to one antenna port number, and S is a positive integer. The channel matrix H corresponds to the M CSI-RSs, the channel matrix H includes M elements, S≥M, and M is a positive integer.

In a possible design, the M CSI-RSs are M CSI-RSs whose signal receiving strengths are selected by the terminal device in descending order from signal receiving strengths that respectively correspond to the S CSI-RSs.

In a possible design, the network device may receive, by using the following two methods, the M antenna port numbers that correspond to the M CSI-RSs sent by the terminal device:

Method 1: The network device receives the M antenna port numbers that correspond to the M CSI-RSs and that are sent by the terminal device on a PUSCH or a PUCCH.

Method 2: The network device receives PMIs that are sent by the terminal device and are of first matrices that correspond to the M antenna port numbers in a first codebook. The first codebook includes a plurality of predefined first matrices, each first matrix corresponds to one PMI, and each first matrix is an S×1 matrix. S elements in each first matrix correspond one-to-one to S antenna port numbers that correspond to the S CSI-RSs, values of elements that respectively correspond to the M antenna port numbers in the first matrices that correspond to the M antenna port numbers are 1, and values of remaining S−M elements are 0.

In a possible design, the quantization result of the channel matrix H includes quantized values of modulus values and quantized values of phases that respectively correspond to M elements that are included in a quantization matrix H that corresponds to the channel matrix H.

In a possible design, the quantization result of the channel matrix H includes M groups of values, and an $i^{th}$ group of values includes a value of an $i^{th}$ $k_1$ and a value of an $i^{th}$ $k_2$ that respectively correspond to $|h_{i1}|$ and $\phi_{i1}$, where $$H' = [h_{11}, \ldots, h_{i1}, \ldots, h_{M1}]^T =$$
$$[|h_{11}|e^{j\phi_{1,1}}, \ldots, |h_{i1}|e^{j\phi_{i,1}}, \ldots, |h_{M1}|e^{j\phi_{M,1}}]^T,$$
$$|h_{i1}| = a + (b-a)\left(\frac{1}{2^{B_{amp}+1}} + \frac{1}{2^{B_{amp}}}k_1\right), k_1 = 0, 1, \ldots, 2^{B_{amp}} - 1$$
$$\phi_{i1} = 2\pi\left(\frac{1}{2^{B_\phi+1}} + \frac{1}{2^{B_\phi+1}}k_2\right), k_2 = 0, 1, \ldots, 2^{B_\phi} - 1,$$

a indicates a minimum quantization value, b indicates a maximum quantization value, $B_{amp}$ indicates a quantity of quantization bits of $|h_{i1}|$, $B_\phi$ indicates a quantity of quantization bits of $\phi_{i1}$, i is a positive integer less than or equal to M, and the M groups of values all meet a throughput maximization principle or an estimated signal to interference plus noise ratio maximization principle.

In a possible design, the quantization result of the channel matrix H includes a quantized value |H| of a modulus value of the quantization matrix H', the quantized values of phases $(\phi_{1,1}, \ldots, \phi_{i,1}, \ldots, \phi_{M,1})$ that respectively correspond to the M elements, and quantized values of transformation phases $(\psi_{M,1}, L, \psi_{i,1}, L, \psi_{2,1})$ that respectively correspond to an Mth element to the second element, so that the network device recovers H1 according to the following formula:

$$H_1 = |H|DG_{M1}{}^T(\psi_{M,1})L\ G_{i1}{}^T(\psi_{i,1})L\ G_{21}{}^T(\psi_{2,1})e_1,$$
where $$H' = [h_{11}, \ldots, h_{i1}, \ldots, h_{M1}]^T = [|h_{11}|e^{j\phi_{1,1}}, \ldots, |h_{M1}|e^{j\phi_{M,1}}]^T,$$

a diagonal matrix D is:

$$D = \begin{bmatrix} e^{j\phi_{1,1}} & L & 0 & L & 0 \\ 0 & O & 0 & L & 0 \\ M & 0 & e^{j\phi_{i,1}} & 0 & M \\ M & M & 0 & O & 0 \\ 0 & 0 & L & 0 & e^{j\phi_{M,1}} \end{bmatrix},$$

a $k^{th}$ Givens rotation matrix is:

$$G_{i1}(\psi_{i,1}) = \begin{bmatrix} 0 & 0 & 0 & 0 & 0 \\ 0 & \cos(\psi_{i,1}) & 0 & \sin(\psi_{i,1}) & 0 \\ 0 & 0 & I_{i-2} & 0 & 0 \\ 0 & -\sin(\psi_{i,1}) & 0 & \cos(\psi_{i,1}) & 0 \\ 0 & 0 & 0 & 0 & 0 \end{bmatrix},$$

i is a positive integer less than or equal to M, the transformation phases $(\psi_{M,1}, L, \psi_{i,1}, L, \psi_{2,1})$ that respectively correspond to the $M^{th}$ element to the second element are obtained based on the channel matrix H and the diagonal matrix D, $e_1 = [1, 0, \ldots, 0]^T$, and $I_{i-2}$ represents an identity matrix of $(i-2)\times(i-2)$.

In a possible design, after the network device receives the M antenna port numbers that correspond to the M CSI-RSs sent by the terminal device, and the PMI that corresponds to the channel matrix H or the quantization result of the channel matrix H, the network device sends data to the terminal device by using antenna ports that respectively correspond to the M antenna port numbers. The data is data encoded based on a precoding matrix.

According to a third aspect, this application provides a terminal device, including a memory, a processor, and a transceiver. The memory stores an instruction, and when the instruction is executed by the processor, the transceiver is configured to receive S channel state information-reference signals CSI-RSs sent by a network device, where each CSI-RS corresponds to one antenna port number, and S is a positive integer. The transceiver is further configured to: send M antenna port numbers that correspond to M CSI-RSs to the network device, and send a precoding matrix indicator PMI that corresponds to a channel matrix H or a quantization result of a channel matrix H to the network device. The channel matrix H corresponds to the M CSI-RSs, any row in the channel matrix H includes M elements, S>M or S=M, and M is a positive integer.

Optionally, M may be configured by the network device or determined by the terminal device.

In a possible design, the M CSI-RSs are M CSI-RSs selected by the terminal device in descending order of signal receiving strengths from the S signal receiving strengths that separately correspond to the S CSI-RSs.

In a possible design, the transceiver is specifically configured to: send the M antenna port numbers on a physical uplink shared channel PUSCH or a PUCCH; or send PMIs of the first matrices that correspond to the M antenna port numbers in a first codebook. The first codebook includes a plurality of predefined first matrices. Each first matrix corresponds to one PMI, and each first matrix is an S×1 matrix. S elements in each first matrix correspond one-to-one to S antenna port numbers that correspond to the S CSI-RSs. The values of elements that respectively correspond to the M antenna port numbers in the first matrices that correspond to the M antenna port numbers are 1, and the values of remaining S-M elements are 0.

In a possible design, the quantization result of the channel matrix H includes quantized values of modulus values and quantized values of phases that respectively correspond to M elements that are included in a quantization matrix H that corresponds to the channel matrix H.

In a possible design, the quantization result of the channel matrix H includes M groups of values, and an $i^{th}$ group of values includes a value of an $i^{th}$ $k_1$ and a value of an $i^{th}$ $k_2$ that respectively correspond to $|h_{i1}|$ and $\phi_{i,1}$, where $$H' = [h_{11}, \ldots, h_{i1}, \ldots, h_{M1}]^T =$$
$$[|h_{11}|e^{j\phi_{1,1}}, \ldots, |h_{i1}|e^{j\phi_{i,1}}, \ldots, |h_{M1}|e^{j\phi_{M,1}}]^T,$$
$$|h_{i1}| = a + (b-a)\left(\frac{1}{2^{B_{amp}+1}} + \frac{1}{2^{B_{amp}}}k_1\right), k_1 = 0, 1, \ldots, 2^{B_{amp}} - 1$$
$$\phi_{i1} = 2\pi\left(\frac{1}{2^{B_\phi+1}} + \frac{1}{2^{B_\phi+1}}k_2\right), k_2 = 0, 1, \ldots, 2^{B_\phi} - 1,$$

a indicates a minimum quantization value, b indicates a maximum quantization value, $B_{amp}$ indicates a quantity of quantization bits of $|h_{i1}|$, $B_\phi$ indicates a quantity of quantization bits of $\phi_{i1}$, i is a positive integer less than or equal to M, and the M groups of values all meet a throughput maximization principle or an estimated signal to interference plus noise ratio maximization principle.

In a possible design, the quantization result of the channel matrix H includes a quantized value |H| of a modulus value of the quantization matrix H', the quantized values of phases $(\phi_{1,1}, \ldots, \phi_{i,1}, \ldots, \phi_{M,1})$ that respectively correspond to the M elements, and the quantized values of transformation phases $(\psi_{M,1}, L, \psi_{i,1}, L, \psi_{2,1})$ that respectively correspond to an $M^{th}$ element to the second element, so that the network device recovers $H_1$ according to the following formula:

$$H_1 = |H|DG_{M1}^T(\psi_{M,1})L\ G_{i1}^T(\psi_{i,1})L\ G_{21}^T(\psi_{2,1})e_1,$$
where $$H' = [h_{11}, \ldots, h_{i1}, \ldots, h_{M1}]^T = [|h_{11}|e^{j\phi_{1,1}}, \ldots, |h_{M1}|e^{j\phi_{M,1}}]^T,$$

a diagonal matrix D is:

$$D = \begin{bmatrix} e^{j\phi_{1,1}} & L & 0 & L & 0 \\ 0 & O & 0 & L & 0 \\ M & 0 & e^{j\phi_{i,1}} & 0 & M \\ M & M & 0 & O & 0 \\ 0 & 0 & L & 0 & e^{j\phi_{M,1}} \end{bmatrix},$$

a $k^{th}$ Givens rotation matrix is:

$$G_{i1}(\psi_{i,1}) = \begin{bmatrix} 0 & 0 & 0 & 0 & 0 \\ 0 & \cos(\psi_{i,1}) & 0 & \sin(\psi_{i,1}) & 0 \\ 0 & 0 & I_{i-2} & 0 & 0 \\ 0 & -\sin(\psi_{i,1}) & 0 & \cos(\psi_{i,1}) & 0 \\ 0 & 0 & 0 & 0 & 0 \end{bmatrix},$$

i is a positive integer less than or equal to M, the transformation phases $(\phi_{1,1}, \ldots, \phi_{i,1}, \ldots, \phi_{M,1})$ that respectively correspond to the $M^{th}$ to second element are obtained based on the channel matrix H and the diagonal matrix D, $e_1 = [1, 0, \ldots, 0]^T$, and $I_{i-2}$ represents an identity matrix of $(i-2) \times (i-2)$.

In a possible design, the transceiver is further configured to: after sending the M antenna port numbers that correspond to the M CSI-RSs to the network device, and sending the precoding matrix indicator PMI that corresponds to the channel matrix H or the quantization result of the channel matrix H to the network device, receive data that is sent by the network device to the terminal device by using antenna ports that respectively correspond to the M antenna port numbers. The data is data encoded based on a precoding matrix.

According to a fourth aspect, this application provides a network device, including a memory, a processor, and a transceiver. The memory stores an instruction, and when the instruction is executed by the processor, the transceiver is configured to send S CSI-RSs. Each CSI-RS corresponds to one antenna port number, and S is a positive integer. The transceiver is further configured to: receive M antenna port numbers that correspond to the M CSI-RSs and that are sent by a terminal device, and a PMI that corresponds to a channel matrix H or a quantization result of a channel matrix H. The channel matrix H corresponds to the M CSI-RSs, the channel matrix H includes M elements, S≥M, and M is a positive integer.

In a possible design, the M CSI-RSs are M CSI-RSs whose signal receiving strengths are selected by the terminal device in descending order from the S signal receiving strengths that respectively correspond to the S CSI-RSs.

In a possible design, the transceiver is configured to: receive the M antenna port numbers that correspond to the M CSI-RSs sent by the terminal device on a PUSCH or a PUCCH; or receive PMIs that are sent by the terminal device and are of first matrices that correspond to the M antenna port numbers in a first codebook. The first codebook includes a plurality of predefined first matrices. Each first matrix corresponds to one PMI, and each first matrix is an S×1 matrix. S elements in each first matrix correspond one-to-one to S antenna port numbers that correspond to the S CSI-RSs. Values of elements that respectively correspond to the M antenna port numbers in the first matrices that correspond to the M antenna port numbers are 1, and values of remaining S-M elements are 0.

In a possible design, the quantization result of the channel matrix H includes quantized values of modulus values and quantized values of phases that respectively correspond to M elements that are included in a quantization matrix H' that corresponds to the channel matrix H.

In a possible design, the quantization result of the channel matrix H includes M groups of values, and an $i^{th}$ group of values includes a value of an $i^{th}$ $k_1$ and a value of an $i^{th}$ $k_2$ that respectively correspond to $|h_{i1}|$ and $\phi_{i1}$, where $$H' = [h_{11}, \ldots, h_{i1}, \ldots, h_{M1}]^T =$$
$$[|h_{11}|e^{j\phi_{1,1}}, \ldots, |h_{i1}|e^{j\phi_{i,1}}, \ldots, |h_{M1}|e^{j\phi_{M,1}}]^T,$$

$$|h_{i1}| = a + (b-a)\left(\frac{1}{2^{B_{amp}+1}} + \frac{1}{2^{B_{amp}}}k_1\right), k_1 = 0, 1, \ldots, 2^{B_{amp}} - 1$$

$$\phi_{i1} = 2\pi\left(\frac{1}{2^{B_\phi+1}} + \frac{1}{2^{B_\phi+1}}k_2\right), k_2 = 0, 1, \ldots, 2^{B_\phi} - 1,$$

a indicates a minimum quantization value, b indicates a maximum quantization value, $B_{amp}$ indicates a quantity of quantization bits of $|h_{i1}|$, $B_\phi$ indicates a quantity of quantization bits of $\phi_{i1}$, i is a positive integer less than or equal to M, and the M groups of values all meet a throughput maximization principle or an estimated signal to interference plus noise ratio maximization principle.

In a possible design, the quantization result of the channel matrix H includes a quantized value |H| of a modulus value of the quantization matrix H', the quantized values of phases $(\phi_{1,1}, \ldots, \phi_{i,1}, \ldots, \phi_{M,1})$ that respectively correspond to the M elements, and quantized values of transformation phases $(\psi_{M,1}, L, \psi_{i,1}, L, \psi_{2,1})$ that respectively correspond to an $M^{th}$ element to the second element, so that the network device recovers $H_1$ according to the following formula:

$$H_1 = |H|DG_{M1}^T(\psi_{M,1})L\ G_{i1}^T(\psi_{i,1})L\ G_{21}^T(\psi_{2,1})e_1,$$
where $$H' = [h_{11}, \ldots, h_{i1}, \ldots, h_{M1}]^T = [|h_{11}|e^{j\phi_{1,1}}, \ldots, |h_{M1}|e^{j\phi_{M,1}}]^T,$$

a diagonal matrix D is:

$$D = \begin{bmatrix} e^{j\phi_{1,1}} & L & 0 & L & 0 \\ 0 & O & 0 & L & 0 \\ M & 0 & e^{j\phi_{i,1}} & 0 & M \\ M & M & 0 & O & 0 \\ 0 & 0 & L & 0 & e^{j\phi_{M,1}} \end{bmatrix},$$

a $k^{th}$ Givens rotation matrix is:

$$G_{i1}(\psi_{i,1}) = \begin{bmatrix} 0 & 0 & 0 & 0 & 0 \\ 0 & \cos(\psi_{i,1}) & 0 & \sin(\psi_{i,1}) & 0 \\ 0 & 0 & I_{i-2} & 0 & 0 \\ 0 & -\sin(\psi_{i,1}) & 0 & \cos(\psi_{i,1}) & 0 \\ 0 & 0 & 0 & 0 & 0 \end{bmatrix},$$

i is a positive integer less than or equal to M, the transformation phases ($\psi_{M,1}$, L, $\psi_{i,1}$, L, $\psi_{2,1}$) that respectively correspond to the $M^{th}$ element to the second element are obtained based on the channel matrix H and the diagonal matrix D, $e_1 = [1, 0, \ldots, 0]^T$, and $I_{i-2}$ represents an identity matrix of (i−2)×(i−2).

In a possible design, the transceiver is configured to: after the network device receives the M antenna port numbers that correspond to the M CSI-RSs, and the PMI that corresponds to the channel matrix H or the quantization result of the channel matrix H that are sent by the terminal device, send data to the terminal device by using antenna ports that respectively correspond to the M antenna port numbers. The data is data encoded based on a precoding matrix.

According to a fifth aspect, this application provides a CSI-RS measurement feedback apparatus. The apparatus includes a receiving unit and a sending unit. The receiving unit is configured to perform the receiving step performed by the terminal device in the first aspect, and the sending unit is configured to perform the sending step performed by the terminal device in the first aspect.

According to a sixth aspect, this application provides a CSI-RS measurement feedback apparatus. The apparatus includes a sending unit and a receiving unit. The receiving unit is configured to perform the receiving step performed by the network device in the second aspect, and the sending unit is configured to perform the sending step performed by the network device in the second aspect.

According to a seventh aspect, an embodiment of this application further provides a communications system, and the communications system includes the network device in the second aspect and the terminal device in the first aspect.

According to an eighth aspect, an embodiment of this application further provides a first computer storage medium storing a computer executable instruction. The computer executable instruction is used to perform the method in the first aspect of this application, or is used to perform the method in the second aspect of this application.

According to a ninth aspect, an embodiment of this application further provides a first computer program product. The computer program product includes a computer program stored in the first computer storage medium, and the computer program includes a program instruction. When the program instruction is executed by a computer, the computer is enabled to perform the method in the first aspect of this application. Alternatively, the computer program product includes a computer program stored in the second computer storage medium, and the computer program includes a program instruction. When the program instruction is executed by a computer, the computer is enabled to perform the method in the second aspect of this application.

According to a tenth aspect, this application further provides a chip. The chip includes a processor and a memory, and the processor is configured to read code stored in the memory, to implement the method and the possible designs in the first aspect, or implement the method and the possible designs in the second aspect.

DESCRIPTION OF EMBODIMENTS

The following describes the embodiments of this application with reference to the accompanying drawings.

Technologies described in this application may be applicable to wireless communications systems that use various radio access technologies, for example, systems that use access technologies such as code division multiple access (CDMA), frequency division multiple access (FDMA), time division multiple access (TDMA), orthogonal frequency division multiple access (OFDMA), and single carrier-frequency division multiple access (SC-FDMA). The technologies are further applicable to subsequent evolved systems such as a 5th generation (5G, which may also be referred to as new radio (NR)) system.

Network elements related to the embodiments of this application include a network device and a terminal device. A network device is an access device that is in a mobile communications system and to which terminal devices are connected in a wireless manner. A network device may be a base station (NodeB), an evolved base station (eNodeB), a base station in a 5G mobile communications system, a base station in a future mobile communications system, an access node in a WiFi system, or the like. A specific technology and a specific device form used by the network device are not limited in the embodiments of this application.

A terminal device may be referred to as a terminal for short, or may be user equipment (UE), a mobile station (MS), a mobile terminal (MT), or the like. The terminal device may be a mobile phone, a tablet, a computer with wireless receiving and transmitting functions, a virtual reality (VR) terminal device, an augmented reality (AR) terminal device, a wireless terminal in industrial control, a wireless terminal in unmanned driving, a wireless terminal in remote surgery, a wireless terminal in a smart grid, a wireless terminal in transportation safety, a wireless terminal in a smart city, a wireless terminal in a smart home, or the like.

It is assumed that the quantity of antenna ports of the network device is S. To obtain channel information, the network device transmits a channel state information reference signal (CSI-RS) by using a plurality of beams, and the terminal device performs channel estimation based on the CSI-RS, quantizes a channel estimation result, and feeds back the channel information. After the network device obtains the channel information, the network device precodes data based on the channel information and sends the data to the terminal device. However, an analog precoding weight usually does not change or get updated, and consequently, performance of a digital-analog hybrid architecture may be affected.

Figure 1:
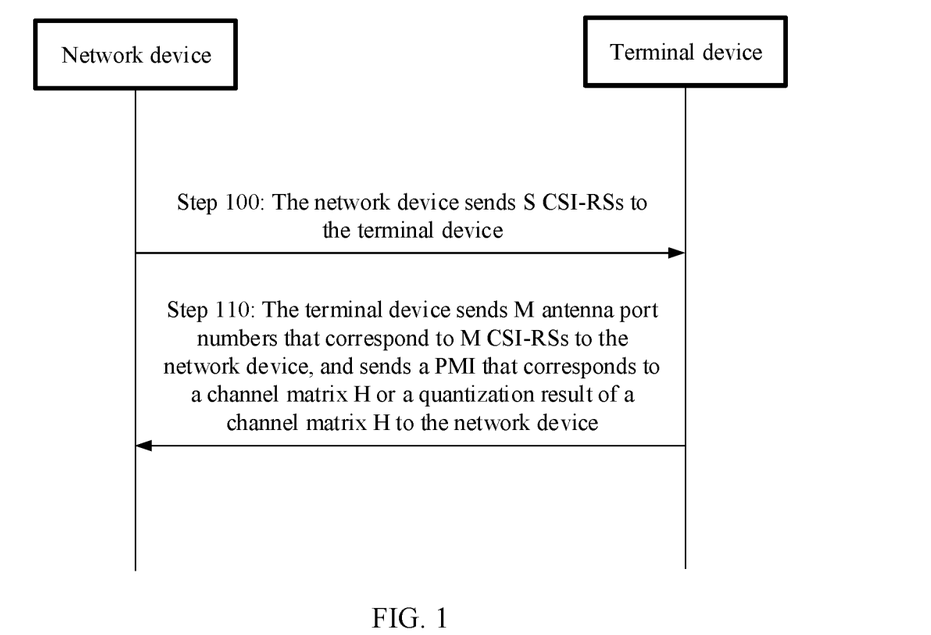
FIG. 1 is an overview flowchart of a CSI-RS measurement feedback method according to this application.

Based on the foregoing description, this application provides a CSI-RS measurement feedback method to optimize the foregoing process. Referring to FIG. 1, the method includes the following steps.

Step 100: A network device sends S CSI-RSs to a terminal device, where each CSI-RS corresponds to one antenna port number, and S is a positive integer.

Step 110: The terminal device sends, based on the S CSI-RSs sent by the network device, M antenna port numbers that correspond to M of the S CSI-RSs to the network device, and sends a precoding matrix indicator (PMI) that corresponds to a channel matrix H or a quantization result of a channel matrix H to the network device. The channel matrix H corresponds to the M CSI-RSs, that is, the channel matrix H is determined based on the M CSI-RSs. Any row in the channel matrix H includes M elements, that is, the M elements correspond to M transmit antenna ports, where S>M, or S=M, and M is a positive integer. Alternatively, any column in the channel matrix H includes M elements, that is, the M elements correspond to M transmit antenna ports. Optionally, M may be configured by the network device or determined by the terminal device.

In a possible design, the M CSI-RSs are M CSI-RSs selected by the terminal device in descending order of signal receiving strength from the S CSI-RSs. According to the foregoing method, the M CSI-RSs are CSI-RSs with relatively high signal receiving strengths. The M CSI-RS are selected to assist the network device in selecting an analog precoding weight, so that M analog beams that correspond to the M antenna port numbers can better point to the terminal device.

The signal receiving strength herein may be reference signal received power (RSRP). The RSRP is a key parameter that represents a radio signal strength and is one of physical layer measurement requirements, and is an average value of signal power received on all resource elements (RE) that carry a reference signal in a symbol.

For step 110, in a possible design, the terminal device may send the M antenna port numbers that correspond to the M CSI-RSs to the network device by using but not limited to the following methods:

Method 1: The terminal device directly sends the M antenna port numbers on a physical uplink shared channel (PUSCH) or a physical uplink control channel (PUCCH).

For example, sequence numbers of S antenna ports are 1, 2, . . . , and S. The terminal device may feedback the M antenna port numbers to the network device on the PUSCH or the PUCCH; or may feedback a quantity M of the antenna port numbers and the corresponding antenna port numbers to the network device.

For example, the M antenna port numbers may further be fed back to the network device in the form of a bitmap.

Method 2: The terminal device sends PMIs of first matrices that correspond to the M antenna port numbers in a first codebook. The first codebook includes a plurality of predefined first matrices, each first matrix corresponds to one PMI, and each first matrix is an S×1 matrix. S elements in each first matrix correspond one-to-one to S antenna port numbers that correspond to the S CSI-RSs. The values of the elements that respectively correspond to the M antenna port numbers in the first matrices that correspond to the M antenna port numbers are 1, and the values of remaining S-M elements are 0.

Specifically, a structure of the first matrix may be W=[0, 1, 1, . . . , 0], and W is an S×1 matrix, where M elements are 1, and other elements are 0.

For example, the terminal device selects the M CSI-RSs in a descending order of signal receiving strengths, determines a corresponding first matrix W, and feeds back a corresponding PMI to the network device.

Therefore, if the M antenna port numbers are fed back by using Method 2, only the PMIs of the first matrices that correspond to the M antenna port numbers need to be fed back, so that uplink overheads can be reduced.

Further, after the terminal device determines the M CSI-RSs in the S CSI-RSs, the terminal determines a corresponding channel matrix H based on the M CSI-RSs, and further obtains a quantization result of the channel matrix H. In this application, the quantization result of the channel matrix H may be in the following two forms.

Form 1: The quantization result of the channel matrix H includes quantized values of modulus values and quantized values of phases that respectively correspond to the M elements that are included in a quantization matrix H' that corresponds to the channel matrix H.

In a possible design, the quantization result of the channel matrix H includes M groups of values, and an $i^{th}$ group of values includes a value of an $i^{th}$ $k_1$ and a value of an $i^{th}$ $k_2$ that respectively correspond to $|h_{i1}|$ and $\phi_{i1}$, where $$H' = [h_{11}, \ldots, h_{i1}, \ldots, h_{M1}]^T =$$
$$[|h_{11}|e^{j\phi_{1,1}}, \ldots, |h_{i1}|e^{j\phi_{i,1}}, \ldots, |h_{M1}|e^{j\phi_{M,1}}]^T$$
$$|h_{i1}| = a + (b-a)\left(\frac{1}{2^{B_{amp}+1}} + \frac{1}{2^{B_{amp}}}k\right), k = 0, 1, \ldots, 2^{B_{amp}} - 1$$
$$\phi_{i1} = 2\pi\left(\frac{1}{2^{B_\phi+1}} + \frac{1}{2^{B_\phi+1}}k\right), k = 0, 1, \ldots, 2^{B_\phi} - 1,$$

a indicates a minimum quantization value, b indicates a maximum quantization value, $B_{amp}$ indicates a quantity of quantization bits of $|h_{i1}|$, $B_\phi$ indicates a quantity of quantization bits of $\phi_{i1}$, and i is a positive integer less than or equal to M. The quantization result of the channel matrix H is determined by using a throughput maximization principle or an estimated signal to interference plus noise ratio (SINR) maximization principle. This application does not include any improvement on the principles, and details are not described herein again.

Form 2: The quantization result of the channel matrix H includes a quantized value |H| of a modulus value of the quantization matrix H', the quantized values of phases $(\phi_{1,1}, \ldots, \phi_{i,1}, \ldots, \phi_{M,1})$ that respectively correspond to the M elements, and quantized values of transformation phases $(\psi_{M,1}, L, \psi_{i,1}, L, \psi_{2,1})$ that respectively correspond to an $M^{th}$ element to the second element, so that the network device recovers $H_1$ according to the following formula:

$$H_1 = |H|DG_{M1}^T(\psi_{M,1})L\ G_{i1}^T(\psi_{i,1})L\ G_{21}^T(\psi_{2,1})e_1,$$

where a diagonal matrix D is:

$$D = \begin{bmatrix} e^{j\phi_{1,1}} & L & 0 & L & 0 \\ 0 & O & 0 & L & 0 \\ M & 0 & e^{j\phi_{i,1}} & 0 & M \\ M & M & 0 & O & 0 \\ 0 & 0 & L & 0 & e^{j\phi_{M,1}} \end{bmatrix},$$

a $k^{th}$ Givens rotation matrix is:

$$G_{i1}(\psi_{i,1}) = \begin{bmatrix} 0 & 0 & 0 & 0 & 0 \\ 0 & \cos(\psi_{i,1}) & 0 & \sin(\psi_{i,1}) & 0 \\ 0 & 0 & I_{i-2} & 0 & 0 \\ 0 & -\sin(\psi_{i,1}) & 0 & \cos(\psi_{i,1}) & 0 \\ 0 & 0 & 0 & 0 & 0 \end{bmatrix},$$

i is a positive integer less than or equal to M, the transformation phases ($\psi_{M,1}$, L, $\psi_{i,1}$, L, $\psi_{2,1}$) that respectively correspond to the $M^{th}$ element to the second element are obtained based on the channel matrix H and the diagonal matrix D, $e_1=[1, 0, \ldots, 0]^T$, and $I_{i-2}$ represents an identity matrix of (i−2)×(i−2).

For example, $\psi_{i,1}$ is obtained through calculation by using the channel matrix H, and the calculation method is not limited. For example, assuming that $x_1$ is equal to an element in the first row and the first column of a matrix $D^TH$, and $x_2$ is equal to an element in the second row and the first column of $D^TH$, then $$\psi_{2,1} = \arccos\left(\frac{x_1}{\sqrt{x_1^2+x_2^2}}\right) = \arcsin\left(\frac{x_2}{\sqrt{x_1^2+x_2^2}}\right).$$

It should be noted that a calculation method of $\psi_{i,1}$ is not limited in this application.

Therefore, a Givens transformation method can significantly reduce the feedback amount, namely, the uplink overheads. Compared with the total feedback amount in the above Form 1 of direct feedback, the uplink overheads can be reduced by approximately 50%.

Therefore, the terminal may obtain the quantization result of the channel matrix H in any one of the foregoing two forms, and send the quantization result to the network device.

In a possible design, the terminal device may define a codebook. The codebook includes a plurality of predefined precoding matrices, and each precoding matrix has a corresponding PMI. After each precoding matrix is matched with the channel matrix H, a precoding matrix closest to the channel matrix H is selected and a corresponding PMI is fed back.

For example, the terminal quantizes the channel matrix H by using a codebook similar to that in LTE release 10, 12, 13, or 14, and feeds back a PMI that is in the codebook and that corresponds to the selected precoding matrix closest to the channel matrix H.

Further, after step 110, in a possible design, the terminal device receives data that is sent by the network device to the terminal device by using antenna ports that respectively correspond to the M antenna port numbers. The received data is encoded data based on the precoding matrix.

Specifically, the network device performs analog precoding on transmit beams that correspond to the M antenna port numbers, and obtains the precoding matrix based on the PMI that corresponds to the channel matrix H or the quantization result of the channel matrix H. Then, the network device sends data to the terminal device using the antenna ports that respectively correspond to the M antenna port numbers, and the data is data encoded based on the precoding matrix.

In this application, the network device sends the S CSI-RSs that correspond to the S antenna ports to the terminal device by using the S antenna ports. The terminal device measures the S CSI-RSs sent by the S antenna ports, and selects antenna port numbers, that is, the M antenna port numbers, of the M antenna ports that correspond to M of the S CSI-RSs. The terminal device feeds back the M antenna port numbers and the PMI that corresponds to the channel matrix H or the quantization result of the channel matrix H. The channel matrix H is determined based on the M CSI-RSs. The network device determines M analog precoding weights based on the M antenna port numbers, and determines an analog beam based on the M analog precoding weights, so that the analog beam can better point to the terminal device. Further, the network device obtains the precoding matrix based on the PMI that corresponds to the channel matrix H or the quantization result of the channel matrix H, and sends data to the terminal device by using the antenna ports that respectively correspond to the M antenna port numbers. The data sent by the network device to the terminal device is the data encoded using on the precoding matrix. Therefore, using the method provided in this application can improve throughput and spectrum utilization efficiency.

Figure 2:
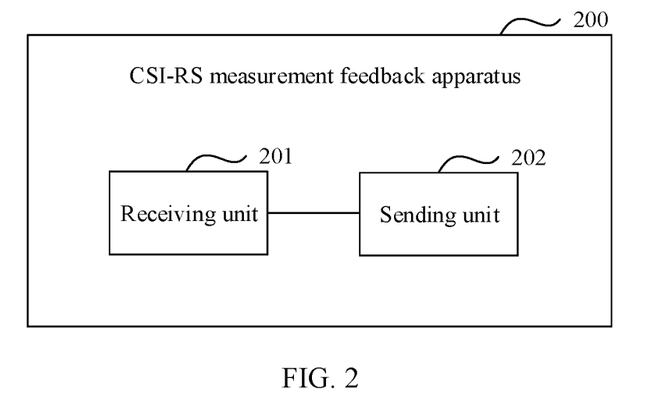
FIG. 2 is a first schematic structural diagram of a CSI-RS measurement feedback apparatus according to this application.

Based on the foregoing embodiments, an embodiment of this application provides a CSI-RS measurement feedback apparatus that corresponds to a terminal device and that is configured to implement the method shown in FIG. 1. Referring to FIG. 2, the CSI-RS measurement feedback apparatus 200 includes a receiving unit 201 and a sending unit 202. The receiving unit 201 is configured to receive S CSI-RSs sent by a network device. The sending unit 202 is configured to send, to the network device based on the S CSI-RSs that are sent by the network device and that are received by the receiving unit 201, M antenna port numbers that correspond to M of the S CSI-RSs, and send a PMI that corresponds to a channel matrix H or the quantization result of a channel matrix H to the network device. For details, refer to the method embodiment shown in FIG. 1, and details are not described herein again in this application.

Figure 3:
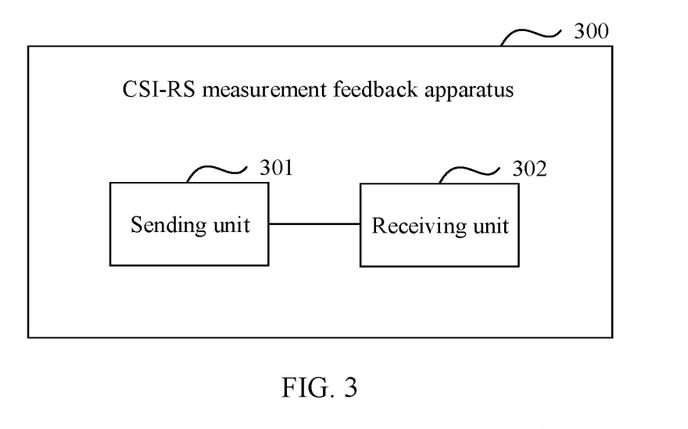
FIG. 3 is a second schematic structural diagram of a CSI-RS measurement feedback apparatus according to this application.

Based on the foregoing embodiments, an embodiment of this application provides a CSI-RS measurement feedback apparatus that corresponds to a network device and that is configured to implement the method shown in FIG. 1. Referring to FIG. 3, the CSI-RS measurement feedback apparatus 300 includes a sending unit 301 and a receiving unit 302. The sending unit 301 is configured to send S CSI-RSs. The receiving unit 302 is configured to receive M antenna port numbers that correspond to M CSI-RSs that are selected and sent by the terminal device based on the received S CSI-RSs sent by the network device, and a PMI that corresponds to a channel matrix H or the quantization result of a channel matrix H. For details, refer to the method embodiment shown in FIG. 1, and details are not described herein again in this application.

The channel matrix H corresponds to the M CSI-RSs, that is, the channel matrix H is determined based on the M CSI-RSs. Any row in the channel matrix H includes M elements that correspond to M transmit antenna ports, where S>M, or S=M, and M is a positive integer. Alternatively, any column in the channel matrix H includes M elements that correspond to M transmit antenna ports.

It should be understood that division of the units in the terminal device and the network device is merely logical function division. In actual implementations, all or some of the units may be integrated into one physical entity, or the units may be physically separated. In addition, the units may be all implemented by software invoked by a processing element or implemented by hardware, or some units may be implemented by software invoked by a processing element and some units are implemented by hardware. For example, a processing unit may be a separately disposed processing element, may be implemented by being integrated into a chip, or may be stored in a memory in a form of a program, and a processing element invokes and executes a function of the unit. Implementations of the other units are similar thereto. In addition, these units may be all or partially integrated, or may be implemented independently. The processing element may be an integrated circuit and has a signal processing capability. In an implementation process, the steps in the foregoing methods or the foregoing units can be implemented by using a hardware integrated logic circuit in the processing element, or by using instructions in a form of software. In addition, the foregoing receiving unit is a receiving control unit, and may receive information by using a receiving apparatus of the terminal device or the network device, for example, an antenna or a radio frequency apparatus. The sending unit is a sending control unit, and may send information by using a sending apparatus of the terminal device or the network device, for example, an antenna and a radio frequency apparatus.

For example, the foregoing units may be one or more integrated circuits configured to implement the foregoing method, for example, one or more application-specific integrated circuits (ASIC), one or more digital signal processors (DSP), or one or more field programmable gate arrays (FPGA). For another example, when one of the foregoing units is implemented by a processing element by invoking a program, the processing element may be a general purpose processor, for example, a central processing unit (CPU) or another processor that can invoke the program. For another example, these units may be integrated together, and implemented in a form of a system-on-a-chip (SOC).

Figure 4:
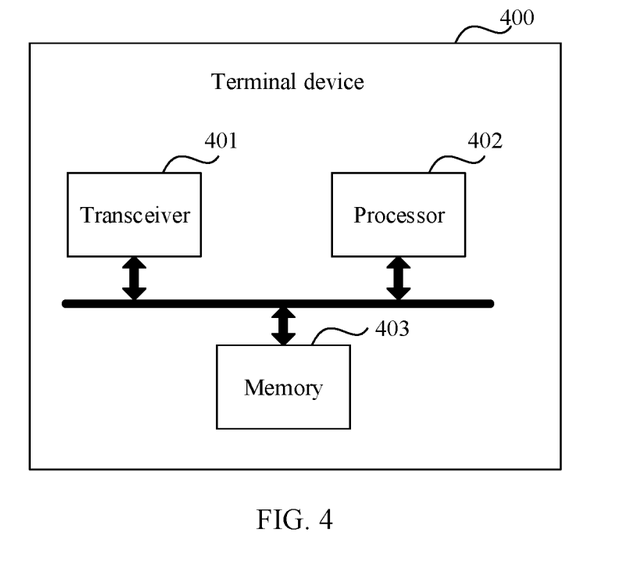
FIG. 4 is a schematic structural diagram of a terminal device according to this application.

Based on the foregoing embodiments, an embodiment of this application further provides a terminal device configured to perform the method shown in FIG. 1. Referring to FIG. 4, the terminal device 400 includes: a transceiver 401, a processor 402, and a memory 403. Functions of the receiving unit 201 and the sending unit 202 in FIG. 2 are implemented using the transceiver 401.

The memory 403 is configured to store a program, an instruction, and the like. Specifically, the program may include program code, and the program code includes a computer operation instruction. The memory 403 may include a random access memory (RAM), and may further include a non-volatile memory, for example, at least one magnetic disk memory. The processor 402 executes an application program stored in the memory 403, to implement the method shown in FIG. 1. For details, refer to the method embodiment shown in FIG. 1. Details are not described herein again in this application.

Figure 5:
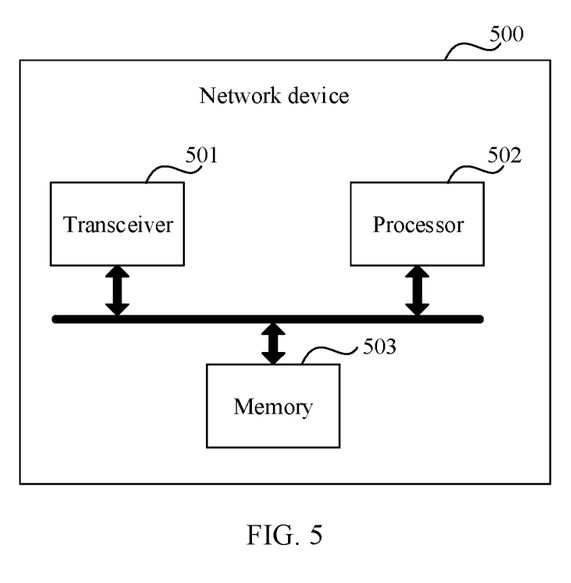
FIG. 5 is a schematic structural diagram of a network device according to this application.

Based on the foregoing embodiments, an embodiment of this application further provides a network device, configured to perform the method shown in FIG. 1. Referring to FIG. 5, the terminal device 500 includes: a transceiver 501, a processor 502, and a memory 503. Functions of the sending unit 301 and the receiving unit 302 in FIG. 3 are implemented by using the transceiver 501.

The memory 503 is configured to store a program, an instruction, and the like. Specifically, the program may include program code, and the program code includes a computer operation instruction. The memory 503 may include a RAM, and may further include a non-volatile memory, for example, at least one magnetic disk memory. The processor 502 executes an application program stored in the memory 503, to implement the method shown in FIG. 1. For details, refer to the method embodiment shown in FIG. 1. Details are not described herein again in this application.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-readable storage media (including but not limited to a disk memory, a CD-ROM, an optical memory, and the like) that include computer-readable program code.

The embodiments of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

It should be noted that a person skilled in the art can make various modifications and variations to embodiments of this application without departing from the spirit and scope of this application. This application is intended to cover these modifications and variations provided that they fall within the scope of protection defined by the following claims and their equivalent technologies.

The invention claimed is:

1. A channel state information reference signal (CSI-RS) measurement feedback method, wherein the method comprises:

receiving S channel state information reference signals (CSI-RSs) from a network device, wherein each CSI-RS corresponds to one antenna port number, and S is a positive integer; and sending M antenna port numbers that correspond to M CSI-RSs to the network device, and sending a precoding matrix indicator (PMI) that corresponds to a quantization result of a channel matrix H to the network device, wherein the channel matrix H corresponds to the M CSI-RSs, any row in the channel matrix H comprises M elements, S>M or S=M, and M is a positive integer;

wherein the quantization result of the channel matrix H comprises quantized values of modulus values and quantized values of phases that respectively correspond to M elements that are comprised in a quantization matrix that corresponds to the channel matrix H.

2. The method according to claim 1, wherein the M CSI-RSs are M CSI-RSs whose signal receiving strengths are selected in descending order from signal receiving strengths that respectively correspond to the S CSI-RSs.

3. The method according to claim 2, wherein the sending M antenna port numbers that correspond to M CSI-RSs to the network device comprises:

sending the M antenna port numbers on a physical uplink shared channel (PUSCH) or a physical uplink control channel (PUCCH); or sending PMIs of first matrices that correspond to the M antenna port numbers in a first codebook, wherein the first codebook comprises a plurality of predefined first matrices, each first matrix corresponds to one PMI, each first matrix is an S×1 matrix, S elements in each first matrix correspond one-to-one to S antenna port numbers that correspond to the S CSI-RSs, values of elements that respectively correspond to the M antenna port numbers in each of the first matrices that correspond to the M antenna port numbers are 1, and values of remaining SM elements in each of the first matrices are 0.

4. The method according to claim 1, wherein the quantization result of the channel matrix H comprises M groups of values, and an $i^{th}$ group of values comprises a value of an $i^{th}$ $k_1$ and a value of an $i^{th}$ $k_2$ that respectively correspond to $|h_{i1}|$ and $\phi_{i1}$, wherein $$H' = [h_{11}, \ldots, h_{i1}, \ldots, h_{M1}]^T =$$
$$[|h_{11}|e^{j\phi_{1,1}}, \ldots, |h_{i1}|e^{j\phi_{i,1}}, \ldots, |h_{M1}|e^{j\phi_{M,1}}]^T,$$

wherein $$|h_{i1}| = a + (b-a)\left(\frac{1}{2^{B_{amp}+1}} + \frac{1}{2^{B_{amp}}}k_1\right), k_1 = 0, 1, \ldots, 2^{B_{amp}} - 1$$

$$\phi_{i1} = 2\pi\left(\frac{1}{2^{B_\phi+1}} + \frac{1}{2^{B_\phi+1}}k_2\right), k_2 = 0, 1, \ldots, 2^{B_\phi} - 1,$$

a indicates a minimum quantization value, b indicates a maximum quantization value, $B_{amp}$ indicates a quantity of quantization bits of $|h_{i1}|$, $B_\phi$ indicates a quantity of quantization bits of $\phi_{i1}$, i is a positive integer less than or equal to M, and the M groups of values all meet a throughput maximization principle or an estimated signal to interference plus noise ratio maximization principle.

5. The method according to claim 1, wherein the quantization result of the channel matrix H comprises a quantized value |H| of a modulus value of a quantization matrix H', quantized values of phases $(\phi_{1,1}, \ldots, \phi_{i,1}, \ldots, \phi_{M,1})$ that respectively correspond to the M elements, and quantized values of transformation phases $(\psi_{M,1}, L, \psi_{i,1}, L, \psi_{2,1})$ that respectively correspond to an $M^{th}$ element to the second element, so that the network device recovers $H_1$ according to the following formula:

$$H_1 = |H|DG_{M1}^T(\psi_{M,1})L\ G_{i1}^T(\psi_{i,1})L\ G_{21}^T(\psi_{2,1})e_1,$$

wherein $$H' = [h_{11}, \ldots, h_{i1}, \ldots, h_{M1}]^T = [|h_{11}|e^{j\Phi_{1,1}}, \ldots,$$
$$|h_{i1}|e^{j\Phi_{i,1}}, \ldots, |h_{M1}|e^{j\Phi_{M,1}}]^T,$$

a diagonal matrix D is:

$$D = \begin{bmatrix} e^{j\phi_{1,1}} & L & 0 & L & 0 \\ 0 & O & 0 & L & 0 \\ M & 0 & e^{j\phi_{i,1}} & 0 & M \\ M & M & 0 & O & 0 \\ 0 & 0 & L & 0 & e^{j\phi_{M,1}} \end{bmatrix},$$

a $k^{th}$ Givens rotation matrix is:

$$G_{i1}(\psi_{i,1}) = \begin{bmatrix} 0 & 0 & 0 & 0 & 0 \\ 0 & \cos(\psi_{i,1}) & 0 & \sin(\psi_{i,1}) & 0 \\ 0 & 0 & I_{i-2} & 0 & 0 \\ 0 & -\sin(\psi_{i,1}) & 0 & \cos(\psi_{i,1}) & 0 \\ 0 & 0 & 0 & 0 & 0 \end{bmatrix},$$

i is a positive integer less than or equal to M, the transformation phases $(\psi_{M,1}, L, \psi_{i,1}, L, \psi_{2,1})$ that respectively correspond to the $M^{th}$ element to the second element are obtained based on the channel matrix H and the diagonal matrix D, $e_1 = [1, 0, \ldots, 0]^T$, and $I_{i-2}$ represents an identity matrix of (i-2)×(i-2).

6. The method according to claim 1, the method further comprises:

receiving, from the network device, data of antenna ports that respectively correspond to the M antenna port numbers, wherein the data is data encoded based on a precoding matrix.

7. An apparatus comprising:

a memory; and one or more processors coupled to the memory, wherein the one or more processors are configured to:

receive S channel state information reference signals (CSI-RSs) from a network device, wherein each CSI-RS corresponds to one antenna port number, and S is a positive integer; and send M antenna port numbers that correspond to M CSI-RSs to the network device, and send a precoding matrix indicator (PMI) that corresponds to a quantization result of a channel matrix H to the network device, wherein the channel matrix H corresponds to the M CSI-RSs, any row in the channel matrix H comprises M elements, S>M or S=M, and M is a positive integer;

wherein the quantization result of the channel matrix H comprises quantized values of modulus values and quantized values of phases that respectively correspond to M elements that are comprised in a quantization matrix H' that corresponds to the channel matrix H.

8. The apparatus according to claim 7, wherein the M CSI-RSs are M CSI-RSs whose signal receiving strengths are selected in descending order from signal receiving strengths that respectively correspond to the S CSI-RSs.

9. The apparatus according to claim 8, wherein the one or more processors are configured to:

send the M antenna port numbers on a physical uplink shared channel PUSCH or a physical uplink control channel PUCCH; or send PMIs of first matrices that correspond to the M antenna port numbers in a first codebook, wherein the first codebook comprises a plurality of predefined first matrices, each first matrix corresponds to one PMI, each first matrix is an S×1 matrix, S elements in each first matrix correspond one-to-one to S antenna port numbers that correspond to the S CSI-RSs, values of elements that respectively correspond to the M antenna port numbers in the first matrices that correspond to the M antenna port numbers are 1, and values of remaining S-M elements are 0.

10. The apparatus according to claim 7, wherein the quantization result of the channel matrix H comprises M groups of values, and an $i^{th}$ group of values comprises a value of an $i^{th}$ $k_1$ and a value of an $i^{th}$ $k_2$ that respectively correspond to $|h_{i1}|$ and $\phi_{i1}$, wherein $$H' = [h_{11}, \ldots, h_{i1}, \ldots, h_{M1}]^T =$$
$$[|h_{11}|e^{j\phi_{1,1}}, \ldots, |h_{i1}|e^{j\phi_{i,1}}, \ldots, |h_{M1}|e^{j\phi_{M,1}}]^T,$$

wherein $$|h_{i1}| = a + (b-a)\left(\frac{1}{2^{B_{amp}+1}} + \frac{1}{2^{B_{amp}}}k_1\right), k_1 = 0, 1, \ldots, 2^{B_{amp}} - 1$$

$$\phi_{i1} = 2\pi\left(\frac{1}{2^{B_\phi+1}} + \frac{1}{2^{B_\phi+1}}k_2\right), k_2 = 0, 1, \ldots, 2^{B_\phi} - 1,$$

a indicates a minimum quantization value, b indicates a maximum quantization value, $B_{amp}$ indicates a quantity of quantization bits of $|h_{i1}|$, $B_\phi$ indicates a quantity of quantization bits of $\phi_{i1}$, i is a positive integer less than or equal to M, and the M groups of values all meet a throughput maximization principle or an estimated signal to interference plus noise ratio maximization principle.

11. The apparatus according to claim 7, wherein the quantization result of the channel matrix H comprises a quantized value |H| of a modulus value of a quantization matrix H', quantized values of phases $(\phi_{i,1}, \ldots, \phi_{i,1}, \ldots, \phi_{M,1})$ that respectively correspond to the M elements, and quantized values of transformation phases $(\psi_{M,1}, L, \psi_{i,1}, L, \psi_{2,1})$ that respectively correspond to an $M^{th}$ element to the second element, so that the network device recovers $H_1$ according to the following formula:

$$H_1 = |H|DG_{M1}^T(\psi_{M,1})L\ G_{i1}^T(\psi_{i,1})L\ G_{21}^T(\psi_{2,1})e_1,$$

wherein $H' = [h_{11}, \ldots, h_{i1}, \ldots, h_{M1}]^T = [|h_{11}|e^{j\phi_{i,i}}, \ldots, |h_{i1}|e^{j\phi_{i,i}}, \ldots, |h_{M1}|e^{j\phi_{M,1}}]^T$, a diagonal matrix D is:

$$D = \begin{bmatrix} e^{j\phi_{1,1}} & L & 0 & L & 0 \\ 0 & O & 0 & L & 0 \\ M & 0 & e^{j\phi_{i,1}} & 0 & M \\ M & M & 0 & O & 0 \\ 0 & 0 & L & 0 & e^{j\phi_{M,1}} \end{bmatrix},$$

a $k^{th}$ Givens rotation matrix is:

$$G_{i1}(\psi_{i,1}) = \begin{bmatrix} 0 & 0 & 0 & 0 & 0 \\ 0 & \cos(\psi_{i,1}) & 0 & \sin(\psi_{i,1}) & 0 \\ 0 & 0 & I_{i-2} & 0 & 0 \\ 0 & -\sin(\psi_{i,1}) & 0 & \cos(\psi_{i,1}) & 0 \\ 0 & 0 & 0 & 0 & 0 \end{bmatrix},$$

i is a positive integer less than or equal to M, the transformation phases $(\psi_{M,1}, L, \psi_{i,1}, L, \psi_{2,1})$ that respectively correspond to the $M^{th}$ element to the second element are obtained based on the channel matrix H and the diagonal matrix D, $e_1 = [1, 0, \ldots, 0]^T$, and $I_{i-2}$ represents an identity matrix of (i-2)×(i-2).

12. The apparatus according to claim 7, wherein the one or more processors are further configured to:
receive from the network device, data of antenna ports that respectively correspond to the M antenna port numbers, wherein the data is data encoded based on a precoding matrix.

13. An apparatus comprising:
a memory; and
one or more processors coupled to the memory, wherein the one or more processors are configured to:
send S CSI-RSs, wherein each CSI-RS corresponds to one antenna port number, and S is a positive integer; and
receive M antenna port numbers that correspond to M CSI-RSs from a terminal device, and a PMI that corresponds to a quantization result of a channel matrix H, wherein the channel matrix H corresponds to the M CSI-RSs, the channel matrix H comprises M elements, S≥M, and M is a positive integer;
wherein the quantization result of the channel matrix H comprises quantized values of modulus values and quantized values of phases that respectively correspond to M elements that are comprised in a quantization matrix H' that corresponds to the channel matrix H.

14. The apparatus according to claim 13, wherein the M CSI-RSs are M CSI-RSs whose signal receiving strengths are selected in descending order from signal receiving strengths that respectively correspond to the S CSI-RSs.

15. The apparatus according to claim 14, wherein the one or more processors are configured to:
receive the M antenna port numbers that correspond to the M CSI-RSs and that are sent by the terminal device on a physical uplink shared channel (PUSCH) or a physical uplink control channel (PUCCH); or
receive PMIs that are sent by the terminal device and that are of first matrices that correspond to the M antenna port numbers in a first codebook, wherein the first codebook comprises a plurality of predefined first matrices, each first matrix corresponds to one PMI, each first matrix is an S×1 matrix, S elements in each first matrix correspond one-to-one to S antenna port numbers that correspond to the S CSI-RSs, values of elements that respectively correspond to the M antenna port numbers in the first matrices that correspond to the M antenna port numbers are 1, and values of remaining S-M elements are 0.

16. The apparatus according to claim 13, wherein the quantization result of the channel matrix H comprises M groups of values, and an $i^{th}$ group of values comprises a value of an $i^{th}$ $k_1$ and a value of an $i^{th}$ $k_2$ that respectively correspond to $|h_{i1}|$ and $\phi_{i1}$, wherein $$H' = [h_{11}, \ldots, h_{i1}, \ldots, h_{M1}]^T =$$
$$[|h_{11}|e^{j\phi_{1,1}}, \ldots, |h_{i1}|e^{j\phi_{i,1}}, \ldots, |h_{M1}|e^{j\phi_{M,1}}]^T,$$

wherein $$|h_{i1}| = a + (b-a)\left(\frac{1}{2^{B_{amp}+1}} + \frac{1}{2^{B_{amp}}}k_1\right), k_1 = 0, 1, \ldots, 2^{B_{amp}} - 1$$

$$\phi_{i1} = 2\pi\left(\frac{1}{2^{B_\phi+1}} + \frac{1}{2^{B_\phi+1}}k_2\right), k_2 = 0, 1, \ldots, 2^{B_\phi} - 1,$$

a indicates a minimum quantization value, b indicates a maximum quantization value, $B_{amp}$ indicates a quantity of quantization bits of $|h_{i1}|$, $B_\phi$ indicates a quantity of quantization bits of $\phi_{i1}$, i is a positive integer less than or equal to M, and the M groups of values all meet a throughput maximization principle or an estimated signal to interference plus noise ratio maximization principle.

17. The apparatus according to claim 13, wherein the quantization result of the channel matrix H comprises a quantized value |H| of a modulus value of a quantization matrix H', quantized values of phases ($\phi_{1,1}, \ldots, \phi_{i,1}, \ldots, \phi_{M,1}$) that respectively correspond to the M elements, and quantized values of transformation phases ($\psi_{M,1}, L, \psi_{i,1}, L, \psi_{2,1}$) that respectively correspond to an $M^{th}$ element to the second element, so that the network device recovers $H_1$ according to the following formula:

$$H_1 = |H|DG_{M1}^T(\psi_{M,1})L\ G_{i1}^T(\psi_{i,1})L\ G_{21}^T(\psi_{2,1})e_1,$$
wherein $H' = [h_{11}, \ldots, h_{i1}, \ldots, h_{M1}]^T = [|h_{11}|e^{j\phi_{i,i}}, \ldots, |h_{i1}|e^{j\phi_{i,1}}, \ldots, |h_{M1}|e^{j\phi_{M,1}}]^T$, a diagonal matrix D is:

$$D = \begin{bmatrix} e^{j\phi_{1,1}} & L & 0 & L & 0 \\ 0 & O & 0 & L & 0 \\ M & 0 & e^{j\phi_{i,1}} & 0 & M \\ M & M & 0 & O & 0 \\ 0 & 0 & L & 0 & e^{j\phi_{M,1}} \end{bmatrix},$$

a $k^{th}$ Givens rotation matrix is:

$$G_{i1}(\psi_{i,1}) = \begin{bmatrix} 0 & 0 & 0 & 0 & 0 \\ 0 & \cos(\psi_{i,1}) & 0 & \sin(\psi_{i,1}) & 0 \\ 0 & 0 & I_{i-2} & 0 & 0 \\ 0 & -\sin(\psi_{i,1}) & 0 & \cos(\psi_{i,1}) & 0 \\ 0 & 0 & 0 & 0 & 0 \end{bmatrix},$$

i is a positive integer less than or equal to M, the transformation phases ($\psi_{M,1}, L, \psi_{i,1}, L, \psi_{2,1}$) that respectively correspond to the $M^{th}$ element to the second element are obtained based on the channel matrix H and the diagonal matrix D, $e_1 = [1, 0, \ldots, 0]^T$, and $I_{i-2}$ represents an identity matrix of (i−2)×(i−2).

\* \* \* \* \*

UNITED STATES PATENT AND TRADEMARK OFFICE
CERTIFICATE OF CORRECTION

PATENT NO. : 11,218,208 B2
APPLICATION NO. : 16/797482
DATED : January 4, 2022
INVENTOR(S) : Yi Huang et al.

Page 1 of 1

It is certified that error appears in the above-identified patent and that said Letters Patent is hereby corrected as shown below:

In the Claims

In Column 17, Line 23 (approx.), in Claim 3, delete "SM" and insert -- S-M --.

In Column 19, Line 33 (approx.), in Claim 11, delete "$\Phi_{i,1}$," and insert -- $\Phi_{1,1}$, --.

In Column 19, Line 43 (approx.), in Claim 11, delete "$e^{j\Phi_{i,i}}$," and insert -- $e^{j\Phi_{1,1}}$, --.

In Column 21, Line 26 (approx.), in Claim 17, delete "$e^{j\Phi_{i,i}}$," and insert -- $e^{j\Phi_{1,1}}$, --.

Signed and Sealed this
Fifth Day of July, 2022

Katherine Kelly Vidal
*Director of the United States Patent and Trademark Office*